United States Patent
Sato et al.

(10) Patent No.: US 10,638,028 B2
(45) Date of Patent: Apr. 28, 2020

(54) APPARATUS, METHOD, RECORDING MEDIUM, AND SYSTEM FOR CAPTURING COORDINATED IMAGES OF A TARGET

(71) Applicant: OLYMPUS CORPORATION, Hachioji-shi, Tokyo (JP)

(72) Inventors: Akinobu Sato, Hachioji (JP); Koichi Shintani, Hachioji (JP); Kenji Homma, Sagamihara (JP); Yoshihisa Ogata, Hachioji (JP); Manabu Tajima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 22 days.

(21) Appl. No.: 15/805,341

(22) Filed: Nov. 7, 2017

(65) Prior Publication Data

US 2018/0131856 A1 May 10, 2018

(30) Foreign Application Priority Data

Nov. 7, 2016 (JP) .................................. 2016-217281

(51) Int. Cl.
*H04N 5/225* (2006.01)
*H04N 5/232* (2006.01)
(Continued)

(52) U.S. Cl.
CPC ....... *H04N 5/23203* (2013.01); *G05D 1/0231* (2013.01); *G05D 1/0274* (2013.01);
(Continued)

(58) Field of Classification Search
CPC .............................. H04N 5/23203; G06T 7/70
(Continued)

(56) References Cited

U.S. PATENT DOCUMENTS 7,123,166 B1 * 10/2006 Haynes ..................... G08G 1/14
340/932.2
2002/0153184 A1 * 10/2002 Song ....................... A47L 9/009
180/167
(Continued)

FOREIGN PATENT DOCUMENTS

JP 2003-216638 A 7/2003
JP 2004-297675 A 10/2004
(Continued)

OTHER PUBLICATIONS

Office Action issued in corresponding Japanese Patent Application No. 2016-217281 dated Mar. 20, 2018, consisting of 10 pp.
(Continued)

*Primary Examiner* — Usman A Khan
(74) *Attorney, Agent, or Firm* — Volpe and Koenig, P.C.

(57) ABSTRACT

A mobile photographing apparatus includes an image sensor provided in a mobile body, a storage section configured to store map information within a moving range of the mobile body, and a control section configured to receive target identification information including information on a moving photographing target generated in accordance with a user's operation, acquire information on a photographing position based on the target identification information, perform movement control to cause the mobile body to move in order for the image sensor to pick up an image of the photographing target based on the information on the photographing position and the map information, and cause the image sensor to pick up an image of the photographing target.

21 Claims, 5 Drawing Sheets

(51) Int. Cl.
   *G05D 1/02*   (2020.01)
   *G06K 9/00*   (2006.01)
   *G06T 7/70*   (2017.01)
   *G05D 1/12*   (2006.01)
   *G01S 13/88*  (2006.01)

(52) U.S. Cl.
   CPC ............ *G05D 1/12* (2013.01); *G06K 9/00664* (2013.01); *G06T 7/70* (2017.01); *H04N 5/232* (2013.01); *G01S 13/88* (2013.01); *G06K 2009/00738* (2013.01)

(58) Field of Classification Search
   USPC .................................................. 348/207.11
   See application file for complete search history.

(56) References Cited

U.S. PATENT DOCUMENTS

| | | | |
|---|---|---|---|
| 2008/0079383 A1* | 4/2008 | Nakamoto | B25J 5/00 318/587 |
| 2008/0089557 A1 | 4/2008 | Iwaki | |
| 2010/0205242 A1* | 8/2010 | Marchioro, II | G06Q 10/10 709/203 |
| 2015/0341550 A1* | 11/2015 | Lay | H04N 5/23222 348/222.1 |

FOREIGN PATENT DOCUMENTS

| | | |
|---|---|---|
| JP | 2006-099627 A | 4/2006 |
| JP | 2006-263844 A | 10/2006 |
| JP | 2006-318062 A | 11/2006 |
| JP | 2010-039845 A | 2/2010 |
| JP | 2013-169222 A | 9/2013 |
| JP | 2013-245688 A | 12/2013 |
| JP | 2013-246588 A | 12/2013 |
| JP | 2015-092302 A | 5/2015 |

OTHER PUBLICATIONS

Office Action issued in corresponding Japanese Patent Application No. 2016-217281 dated Jan. 9, 2018, consisting of 13 pp.
Office Action issued in corresponding Japanese Patent Application No. 2019-040877 dated Apr. 9, 2019, consisting of 8 pp.

* cited by examiner

APPARATUS, METHOD, RECORDING MEDIUM, AND SYSTEM FOR CAPTURING COORDINATED IMAGES OF A TARGET

CROSS REFERENCE TO RELATED APPLICATION

This application claim is benefit of Japanese Application No. 2016-217281 in Japan on Nov. 7, 2016, the contents of which are incorporated by this reference.

BACKGROUND OF THE INVENTION

Field of the Invention

The present invention relates to a mobile photographing apparatus, a mobile photographing control apparatus, a photographing device, a photographing method, a control method of the mobile photographing apparatus, and a recording medium for recording a photographing program, suitable for an autonomous mobile body.

Description of Related Art

Autonomous mobile bodies such as a robot cleaner or drone have been commercialized in recent years. Such mobile bodies are used for a variety of purposes: activities in dangerous places, activities in places where humans can hardly enter or liberation of humans from troublesome or tiresome work or the like.

For example, Japanese Patent Application Laid-Open Publication No. 2006-263844 discloses a robot that moves in accordance with a user's instruction.

SUMMARY OF THE INVENTION

In coming years, there will be an increasing desire for executing an operation required by a user by causing some devices to operate in coordination. The present invention enables a mobile photographing apparatus to operate in coordination with other devices.

A mobile photographing apparatus according to an aspect of the present invention includes an image sensor provided in a mobile body, a storage section configured to store map information within a moving range of the mobile body, and a control section configured to receive target identification information including information of a moving photographing target generated in accordance with a user's operation, acquire information on a photographing position based on the target identification information, perform movement control to cause the mobile body to move to pick up an image of the photographing target through the image sensor based on the information on the photographing position and the map information, and cause the image sensor to pick up an image of the photographing target.

A mobile photographing apparatus according to an aspect of the present invention includes an image sensor provided in a mobile body and configured to photograph a predetermined target, and a map information section configured to create map information within a moving range of the mobile body during movement of the mobile body, and create information on a photographing spot corresponding to the map information, based on information for identifying a photographing spot suitable for the predetermined target to be photographed.

A mobile photographing control apparatus according to an aspect of the present invention includes a target identification information generation section configured to generate target identification information based on information acquired in accordance with a user's photographing operation, a communication section configured to perform communication with a mobile body control section of a mobile body mounted with a mobile body drive section, an image sensor and the mobile body control section configured to control the mobile body drive section and the image sensor, and a control section configured to cause, when the communication by the communication section is established, the mobile body control section to transmit the target identification information for controlling the mobile body drive section and the image sensor.

A photographing device according to an aspect of the present invention includes an image sensor configured to acquire a picked-up image in accordance with a user's photographing operation, a target identification information generation section configured to generate target identification information based on the picked-up image acquired by the image sensor, a communication section configured to perform communication with a mobile body control section of a mobile body mounted with a mobile body drive section, an image sensor and the mobile body control section configured to control the mobile body drive section and the image sensor, and a control section configured to cause, when the communication by the communication section is established, the mobile body control section to transmit the target identification information for controlling the mobile body drive section and the image sensor.

A control method of a mobile photographing apparatus by a photographing device according to an aspect of the present invention includes a step of acquiring a picked-up image by an image sensor in accordance with a user's photographing operation, a step of generating target identification information based on the picked-up image acquired by the image sensor, and a step of performing communication related to the target identification information with the mobile photographing apparatus including a drive section.

A photographing method according to an aspect of the present invention includes receiving map information within a moving range of a mobile body and target identification information including information on a moving photographing target which is generated in accordance with a user's operation, performing movement control to cause the mobile body to move to pick up an image of the photographing target using an image sensor based on the map information, and causing the image sensor provided in the mobile body to pick up an image of the photographing target.

A recording medium configured to record a photographing program according to an aspect of the present invention is a non-transitory computer-readable recording medium, the photographing program causing a computer to execute a step of storing map information within a moving range of a mobile body, a step of receiving target identification information including information on a moving photographing target generated in accordance with a user's operation and the target identification information, a step of performing movement control to cause the mobile body to move to pick up an image of the photographing target using an image sensor based on the map information, and a step of causing an image sensor provided in the mobile body to pick up an image of the photographing target.

A mobile photographing apparatus according to another aspect of the present invention includes an image sensor configured to be movable and enabled to perform image pickup to pick up an image of a specified photographing target, a memory configured to store map information within a moving range of the image sensor, and a prediction section configured to detect a movement of the photographing target through a picked-up image of the image sensor and predict a time at which the photographing target moves to a specific place according to a result of detection of movement of the photographing target and the map information.

The above and other objects, features and advantages of the invention will become more clearly understood from the following description referring to the accompanying drawings.

DETAILED DESCRIPTION OF PREFERRED EMBODIMENTS

Hereinafter, embodiments of the present invention will be described in detail with reference to the accompanying drawings.

Figure 1:
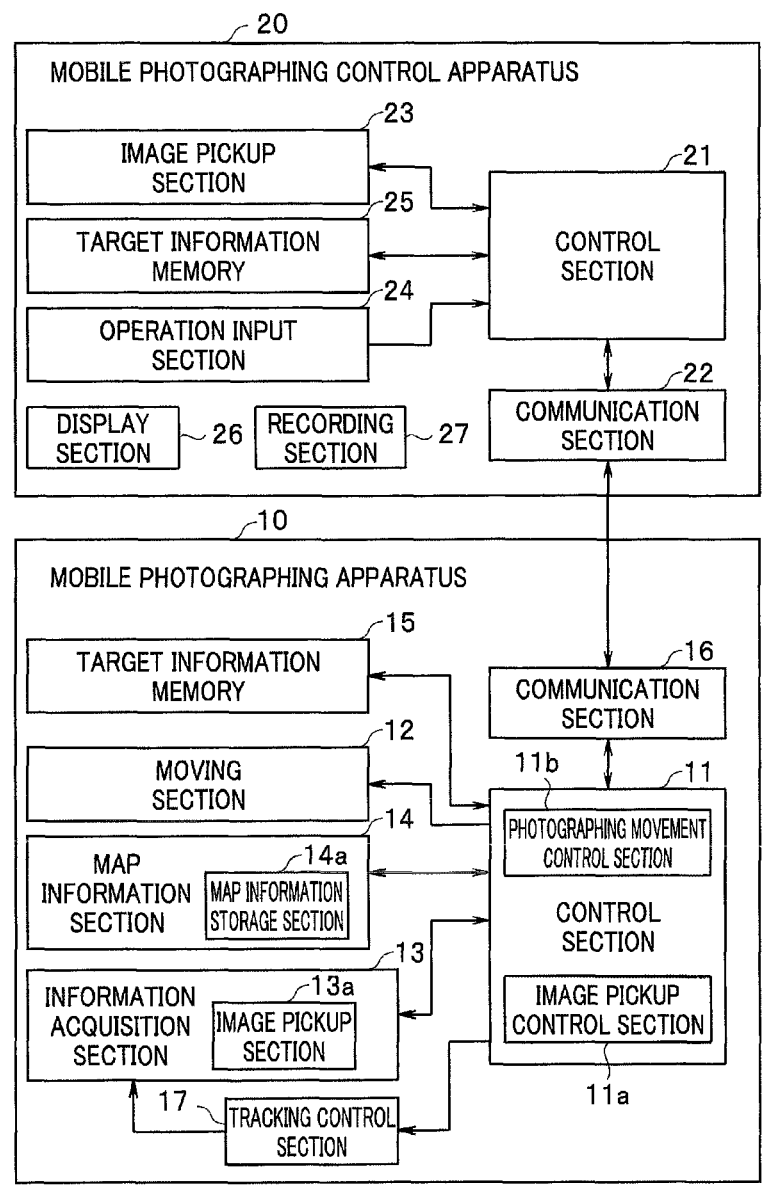
FIG. 1 is a block diagram illustrating a mobile photographing apparatus and a mobile photographing control apparatus according to an embodiment of the present invention.

FIG. 1 is a block diagram illustrating a mobile photographing apparatus and a mobile photographing control apparatus according to an embodiment of the present invention.

A mobile photographing apparatus 10 according to the present embodiment is autonomous and freely movable. The mobile photographing apparatus 10 can move apart from the location of a user and is independent of the location of the user, and can thereby perform photographing relatively easily during tracking or parallel running in addition to photographing at a position, an angle of view or an angle at which the user cannot photograph easily.

Various publicly known autonomously movable devices may be used as the mobile photographing apparatus 10. For example, a robot cleaner which is movable in a room may be adopted as the mobile photographing apparatus 10 or an automatic running vehicle that moves on ground or unmanned aircraft such as a drone or an autonomous vessel that moves on the water may be adopted.

In FIG. 1, the mobile photographing apparatus 10 includes a control section 11. The control section 11 may also be constructed of a processor using a CPU, which is not shown, or the like or each function of the control section 11 may be implemented according to a program stored in a memory, which is not shown. The mobile photographing apparatus 10 is provided with a moving section 12. The moving section 12 includes various moving mechanisms to move the mobile photographing apparatus 10. For example, when the mobile photographing apparatus 10 uses a robot cleaner or the like, wheels are used as the moving mechanism. When the mobile photographing apparatus 10 uses a drone, a propeller is used as the moving mechanism. A leg moving robot may be used as the mobile photographing apparatus 10 or a caterpillar moving robot may be used. Note that the moving section 12 includes a drive mechanism such as a motor or an engine to drive the moving mechanism. The moving section 12 is enabled to cause the mobile photographing apparatus 10 to move in a desired direction under the control of the control section 11.

The mobile photographing apparatus 10 is provided with an information acquisition section 13. The information acquisition section 13 is provided with an image pickup section 13a. The image pickup section 13a is provided with an image pickup device (image sensor), which is not shown, made up of a CCD or CMOS sensor and an optical system, which is not shown, guides an optical image of an object to an image pickup surface of the image pickup device. In the optical system, mechanism sections that drive a focus lens, a zoom lens, an aperture and the like, which are not shown, and a drive section that drives these mechanism sections are constructed.

The control section 11 is provided with an image pickup control section 11a and the image pickup control section 11a drives and controls the drive section in the optical system so as to drive and control the focus lens, the zoom lens and the aperture configured in the optical system. An image pickup device photoelectrically converts an optical image of an object and obtains a moving image or a still image. This picked-up image is given to the control section 11.

Furthermore, the mobile photographing apparatus 10 is provided with a tracking control section 17. The tracking control section 17 is configured to be able to track a predetermined object in a picked-up image acquired by the image pickup section 13a under the control of the control section 11. For example, when an object being tracked moves, the tracking control section 17 is configured to be able to control an angle of view so that the object being tracked is included within a view range of the image pickup section 13a.

The mobile photographing apparatus 10 is provided with a communication section 16 and the communication section 16 is configured to be able to transmit/receive information to/from an external device such as the mobile photographing control apparatus 20 wiredly or wirelessly under the control of the control section 11. The control section 11 is also configured to be able to transmit an image picked up by the image pickup section 13a to an external device via the communication section 16. The mobile photographing apparatus 10 may also be provided with a memory so as to cause the memory to store the picked-up image acquired by the image pickup section 13a.

Note that when carrying out wireless communication, the communication section 16 and a communication section 22, which will be described later, can be constructed of, for example, NFC (near field communication) or BLE (Bluetooth (registered trademark) low energy), and can thereby sufficiently reduce power consumption.

The information acquisition section 13 may also be provided with not only the image pickup section 13a but also a sound collection section (not shown). The sound collection section is configured to be able to collect ambient sound of the mobile photographing apparatus 10 and output voice information to the control section 11. The control section 11 can transmit the voice information to an external device via the communication section 16 or can also store the voice information in a memory for recording, which is not shown. Even if an image is optically shielded, this voice sensor can detect target-specific or target-related sound, and so the voice sensor can be said to be a remote detection sensor.

Note that the image pickup section 13a is configured to be able to pick up images in a predetermined direction around the mobile photographing apparatus 10 and obtain picked-up images. The image pickup section 13a is preferably configured to be able to pick up images in an arbitrary direction with respect to a moving direction of the mobile photographing apparatus 10. For example, when the mobile photographing apparatus 10 is constructed of a columnar or polygonal prism shaped robot cleaner, it may be possible to form the mobile photographing apparatus 10 to be freely rotatable with respect to the floor surface and cause its side face to be oriented toward an arbitrary direction in order for the optical system of the image pickup section 13a to be attached to the side face of the mobile photographing apparatus 10 and enable the view direction to be oriented toward a predetermined direction.

The control section 11 can cause the mobile photographing apparatus 10 to move according to a predetermined program. For example, when the mobile photographing apparatus 10 is constructed of a robot cleaner, a movement of the mobile photographing apparatus 10 is controlled so as to clean the whole room in which the robot cleaner is placed. For example, the mobile photographing apparatus 10 constructed of the robot cleaner may adopt a technique for moving the mobile photographing apparatus 10 so as to clean the whole room based on a random moving pattern or a technique for moving the mobile photographing apparatus 10 so as to create a map of the room based on an image picked up during the movement and clean the whole room using this map. The movement of the mobile photographing apparatus 10 may be controlled by any one of the techniques.

Thus, robots or the like constituting mobile photographing apparatuses are evolving into a direction where they can autonomously move while avoiding obstacles, and in order to prevent collision and implement desired functions, the own position, movement, speed and orientation are confirmed using various autonomous control sensors, and a rational and safe moving route is determined by making full use of map information within a moving range or the like in recent years, all of which are achieved by a program including learning by artificial intelligence. Examples of the autonomous control sensors include, GPS, laser radar, altimeter, acceleration sensor, terrestrial magnetism sensor, and the current position may be estimated based on a traveling distance from a reference position and a traveling direction. An image pickup section or the like can also be used.

Also in the present embodiment, the mobile photographing apparatus 10 is provided with not only the image pickup section 13a but also a map information section 14. The map information section 14 is constituted of a communication circuit and control circuits such as a CPU, an ASIC, and the like. The map information section 14 may use map information recorded in advance in a recording section, or create a map of the room based on an image picked up by the image pickup section 13a during movement and store the map information in a map information storage section 14a. In addition, the map information section 14 may acquire map information from outside. Thus, when map information is available and the own position is known, it is easy to determine how to reach a destination from positions of obstacles included in the map information. The positions of the obstacles may also be recorded in advance or they may be learned by movements. Note that as will be described later, even when no map information is included, it is possible to achieve some functions of the present embodiment and the creation and storage of the map information is not always an essential configuration in the present embodiment.

Furthermore, in the present embodiment, the control section 11 includes a photographing movement control section 11b and the photographing movement control section 11b is configured to be able to control a movement of the mobile photographing apparatus 10 to pick up images. In the present embodiment, the photographing movement control section 11b controls a movement of the mobile photographing apparatus 10 based on information stored in the target information memory 15. The target information memory 15 stores information for identifying a target such as an object desired by the user (hereinafter referred to as "target identification information"). In the present embodiment, the control section 11 is configured to receive the target identification information from the mobile photographing control apparatus 20.

The mobile photographing control apparatus 20 can be constructed of a photographing device such as a digital camera or a smartphone having a photographing function. This is supposed to be held by hand, worn or operated by the user, and operations such as manual operation, vocal operation or operation using a biological signal are possible. Therefore, the moving function is not particularly necessary, but the mobile photographing control apparatus 20 may be placed somewhere and can be remotely operated in that condition.

The mobile photographing control apparatus 20 includes a control section 21. The control section 21 may also be constructed of a processor using a CPU, which is not shown, or the like or the respective functions may be implemented according to a program stored in a memory, which is not shown. The mobile photographing control apparatus 20 is provided with the communication section 22 and the communication section 22 can transmit/receive information to/from a communication section 16 of the mobile photographing apparatus 10 under the control of the control section 21.

The mobile photographing control apparatus 20 includes an image pickup section 23. The image pickup section 23 is provided with an image pickup device which is not shown, composed of an image sensor (CCD or CMOS sensor) or the like, in which an optical image of an object is configured to be guided to an image pickup surface of the image pickup device by an optical system, which is not shown. Mechanism sections configured to drive a focus lens, a zoom lens and an aperture which are not shown, or the like and drive sections that drive these mechanism sections are constructed in the optical system.

The control section 21 is configured to drive and control the drive sections in the optical system to drive and control the focus lens, the zoom lens and the aperture constructed in the optical system. The image pickup device photoelectrically converts an optical image of an object to obtain a picked-up image such as a moving image or still image. This picked-up image is given to the control section 21. The control section 21 gives the picked-up image to a recording section 27. The recording section 27 records the given picked-up image in a predetermined recording medium. The control section 21 gives the picked-up image to a display section 26. The display section 26 includes a display screen composed of an LCD or the like and can display the given picked-up image on a display screen.

The mobile photographing control apparatus 20 is provided with an operation input section 24. The operation input section 24 includes a shutter button, a dial, function buttons and various switches, which are not shown, or the like configured to receive the user's operation and give an operation signal to the control section 21. Note that a touch panel, which is not shown, provided on the display screen of the display section 26 may also be adopted as the operation input section 24. The touch panel can generate an operation signal in accordance with a position on the display screen pointed to by the user's finger. The operation signal from the operation input section 24 is supplied to the control section 21. The control section 21 is configured to execute processing in accordance with the operation signal from the operation input section 24.

In the present embodiment, the mobile photographing control apparatus 20 is provided with a target information memory 25. The target information memory 25 is configured to be able to store target identification information given from the control section 21. The control section 21 is configured to generate target identification information based on the information recorded in the recording section 27 and the user's operation of the operation input section 24, give the target identification information to the target information memory 25 so as to be stored therein.

The target identification information is information for identifying a target captured by the mobile photographing apparatus 10. Note that the term "capture" means that the mobile photographing apparatus 10 can take some action on the target, and examples of the action include tracking of a target by the mobile photographing apparatus 10 and picking up of an image of the target by the mobile photographing apparatus 10.

For example, the target identification information is intended to identify an object which is an image pickup target of the mobile photographing apparatus 10. Furthermore, with a predetermined aspect of the target as a condition, the target identification information may also include information for the mobile photographing apparatus 10 to capture a target under the condition (aspect condition). For example, when a person is specified as an object, the target identification information may be information for identifying the person and include information of the aspect condition of a predetermined pose of the person. When such target identification information is given, the mobile photographing apparatus 10 is configured to be able to capture and pick up an image of the person making a predetermined pose. Note that the aspect condition may not only be the pose of the target at the time of image pickup, but also determine a composition at the time of image pickup. For example, the photographing position and background are set depending on the aspect condition.

That is, a photographing target expected by the mobile photographing apparatus 10 is often a mobile target, what the photographer (user) can simply specify is a moving photographing target itself, and if there is a demand for the position at which the moving image pickup target is photographed or for the background, it is possible to ask the mobile photographing apparatus to photograph a desired image without the need for the user to bother to visit a remote place. Therefore, the mobile photographing apparatus 10 can photograph an image that satisfies the user's desire or an image that the user cannot easily photograph on behalf of the user according to the target identification information and by obtaining information on the moving photographing target and the position or background of the moving photographing target to be photographed.

For example, assuming recognition results of persons, pets or objects among the picked-up images recorded in the recording section 27 as targets, the control section 21 may acquire information for identifying the target as the target identification information. Using publicly known face recognition techniques or the like, the control section 21 can recognize persons, pets or various objects from the picked-up images. Furthermore, the control section 21 may identify a target through character recognition for characters in the picked-up image and acquire the target identification information. Furthermore, for example, the control section 21 may identify the target based on meta information added to the picked-up image recorded in the recording section 27 and acquire the target identification information. Furthermore, for example, the control section 21 may identify a target based on the user's operation on the operation input section 24 and acquire the target identification information.

Furthermore, when identifying the target, the control section 21 may also use information on a frequency with which the target appears in the picked-up image recorded in the recording section 27. For example, the control section 21 may set a person who appears with the highest frequency in the picked-up image recorded in the recording section 27 as the target and acquire information for identifying the person as the target identification information.

Furthermore, for example, the control section 21 may also set target identification information including aspect conditions such as a predetermined pose about the person or the like obtained as a result of face recognition or the like. For example, when the person who appears with the highest frequency in the picked-up image recorded in the recording section 27 is a baby, as an aspect condition being a state in which the baby is standing holding onto something, the control section 21 may generate target identification information in which the baby when this aspect condition is satisfied is set as the target.

The control section 21 may acquire the aspect condition to be set based on the user's operation through the operation input section 24 or may acquire the aspect condition through an image analysis on the picked-up image. For example, the control section 21 performs face recognition processing on the picked-up image recorded in the recording section 27 and selects a target that appears with the highest frequency in the picked-up image. In this case, when the target is a baby, the control section 21 makes an image analysis on the image of the baby, and if it is determined that picked-up images of the baby are stored for a half year or longer, or there are images of the baby sitting on its buttocks and there is no image of the baby standing holding onto something, the fact that the baby is standing holding onto something may be set as the aspect condition.

Thus, what kind of photographing image is preferred can be determined by an analysis of tendency of images on the network or the like and this can be learned from results of contribution in these databases or results of writings of viewers or may be programmed in advance. Photographing spots can be determined from this preferred photographed image. In some cases, the photographing spot is determined by a suitable background in accordance with the object, while in other cases, the photographing spot is determined, irrespective of the object, depending only on attractiveness of the background, for example, fineness and tidiness of the background. If an image in which a sofa appears in the background is preferred, the place of the sofa becomes the photographing spot. Note that the movement need not be so precise and it should be noted that a target photographing spot at which a target should be photographed and a camera photographing spot at which a target can be easily photographed by a camera are similar but not the same. However, since photographing is possible if the target is closer, the expression "substantially the same place" is used to facilitate the description. The expression "vicinity of the photographing position" is also used.

Figure 2:
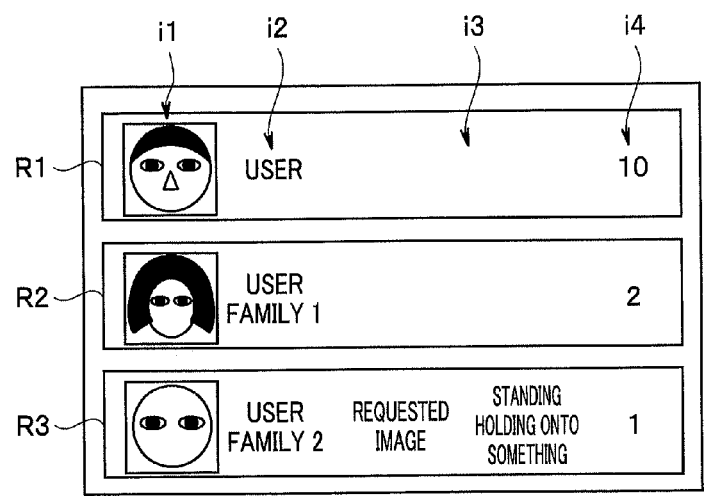
FIG. 2 is a diagram illustrating information stored in a target information memory 25 in FIG. 1.

FIG. 2 is an explanatory diagram to describe information stored in the target information memory 25 in FIG. 1. The example in FIG. 2 shows an example where there are three records R1 to R3 as target identification information. The respective records R1 to R3 include information on items i1 to i4. The item i1 is image information on a face recognition result, the item i2 is information on a name corresponding to the face recognition result, the item i3 is information on an aspect condition and the item i4 is information on priority. The respective records R1 to R3 in FIG. 2 show information on a father, a mother and a baby. The example in FIG. 2 shows that a target set to the highest priority 1 is the baby denoted by user family 2 and "standing holding onto something" specified as a requested image is set as an aspect condition.

Note that in the case where the target is a baby, not only standing holding onto something, but also scenes of the baby standing up for the first time, the baby starting to walk for the first time or the baby playing with a stuffed animal or the like can be set as the aspect conditions. For example, in a case where a robot cleaner is adopted as the mobile photographing apparatus 10, the robot cleaner can pick up images for a relatively long period of time while moving around in a room where adult people are not present, and is likely to pick up images of these scenes without missing precious shutter chances. Moreover, the robot cleaner can pick up images from a position near the floor and may take pictures with taste different from ordinary photographing by adult people.

The robot cleaner may record a place where the baby can easily stand holding onto something, a place where a stuffed animal or the like is located in advance or grasp those places in advance through daily image determination during movement such as cleaning. If sofas or the like are found among popular images on the Internet, it is possible to determine whether or not similar sofa is found through images or a distance distribution or the like.

The control section 21 controls the communication section 22 to search for an autonomous mobile body having a communication function and capable of taking some action on a target such as an image pickup function. Upon succeeding in the search of such a mobile body, the control section 21 communicates with the mobile body. When this communication is established, the control section 21 transmits target identification information stored in the target information memory 25 to the mobile body. For example, when communication with the mobile photographing apparatus 10 is established, the control section 21 transmits the target identification information stored in the target information memory 25 to the mobile photographing apparatus 10.

Note that when the user performs a transmission operation using the operation input section 24, the control section 21 may transmit the target identification information to the mobile body such as the mobile photographing apparatus 10.

According to the present embodiment, the target identification information is generated based on a picked-up image acquired through the user's photographing operation or the user's input operation, and therefore the target identification information is assumed to reflect the user's preferences. That is, the mobile photographing control apparatus 20 is intended to generate target identification information reflecting the user's preferences through ordinary use of the camera of picking up images of the user desired object. The mobile photographing control apparatus 20 transmits the generated target identification information to the mobile photographing apparatus 10 that can pick up images while autonomously moving around, and can thereby obtain picked-up images of the user's own preferences at a position, angle of view or timing at which the user himself or herself cannot photograph targets or without performing any photographing operation for the user himself or herself.

For example, in a meeting of animal pet lovers, each pet is photographed in advance and recorded in the recording section 27, target identification information is thereby generated based on the photos of the pet, and it is thereby possible to automatically pick up images of each pet present in the meeting based on this target identification information.

Upon receiving the target identification information via the communication section 16, the control section 11 of the mobile photographing apparatus 10 gives the received target identification information to the target information memory 15 so as to be stored therein. The photographing movement control section 11b reads the target identification information stored in the target information memory 15 to control the movement of the mobile photographing apparatus 10. For example, the photographing movement control section 11b causes the mobile photographing apparatus 10 to move so as to capture a specified target under the aspect condition specified by the target identification information. For example, the photographing movement control section 11b of the mobile photographing apparatus 10 analyzes picked-up images acquired by the image pickup section 13a, determines whether or not an image of the target specified by the target identification information exists in the image, controls, when the image exists, for example, the tracking control section 17 and the moving section 12, and can thereby continue to capture the target.

Thus, the information acquisition section 13 of the mobile photographing apparatus 10 has a target image pickup function and a detection function to capture the target. For this detection function, the information acquisition section 13 may adopt not only the image pickup section 13a but also various autonomous control sensors or environment sensors. For example, the information acquisition section 13 may adopt a radar apparatus, atmospheric pressure sensor, acceleration sensor, gyro scope or the like as appropriate.

For example, the photographing movement control section 11b can also cause the mobile photographing apparatus 10 to move to a position where images of the specified aspect condition of the target specified by the target identification information can be picked up as an object.

For example, when the target specified by the target identification information exists within an image pickup range, the photographing movement control section 11b causes the mobile photographing apparatus 10 to move while tracking the target so that the target continues to be located within the image pickup range. Furthermore, when the position at which images of the target are picked up is determined by the aspect condition, the photographing movement control section 11b may also cause the mobile photographing apparatus 10 to move to the position regardless of whether or not the target is included within the image pickup range.

For example, when images of a baby standing holding onto something are picked up, since the baby often stands holding onto something by taking advantage of a difference in height such as a sofa or stair, the control section 21 of the mobile photographing control apparatus 20 may set the aspect condition so as to pick up images where there is a difference in height such as the sofa or stair. For example, the control section 21 may also set the aspect condition so that images are picked up at popular scenes according to the age or gender of the target using a publicly known gender or age estimation algorithm through face recognition including information on popular scenes for each age. Such an aspect condition suitable for image pickup may be formed into templates according to the age or gender or the like, and the control section 21 may be configured to set the aspect condition by reading such templates from a memory or a computer on the cloud which are not shown.

Note that the control section 21 may identify a target or set an aspect condition by accessing a computer on the cloud via the communication section 22 and using artificial intelligence on the cloud.

When the image pickup section 23 picks up images of a target set by the target identification information during image pickup, the control section 21 may transmit information indicating that images of the target are picked up to the control section 11 of the mobile photographing apparatus 10 so that the mobile photographing control apparatus 20 and the mobile photographing apparatus 10 operate in coordination to perform image pickup.

Figure 3:
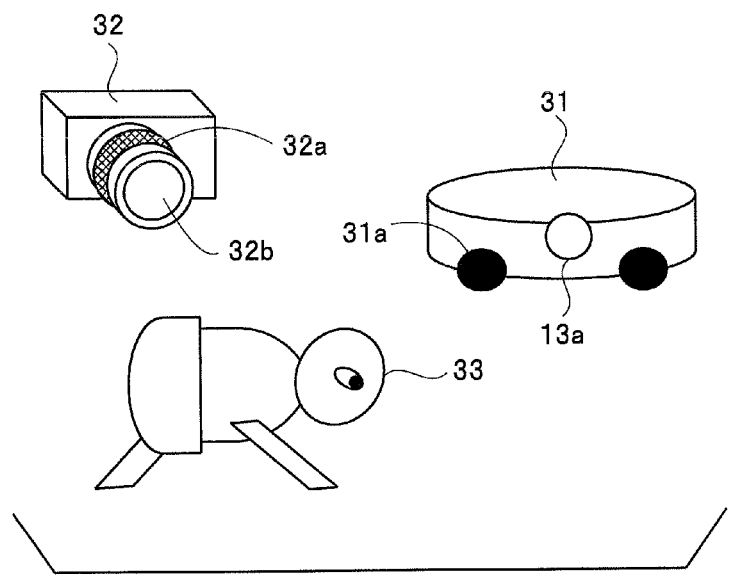
FIG. 3 is a diagram illustrating a situation of use according to the embodiment.
Figure 4:
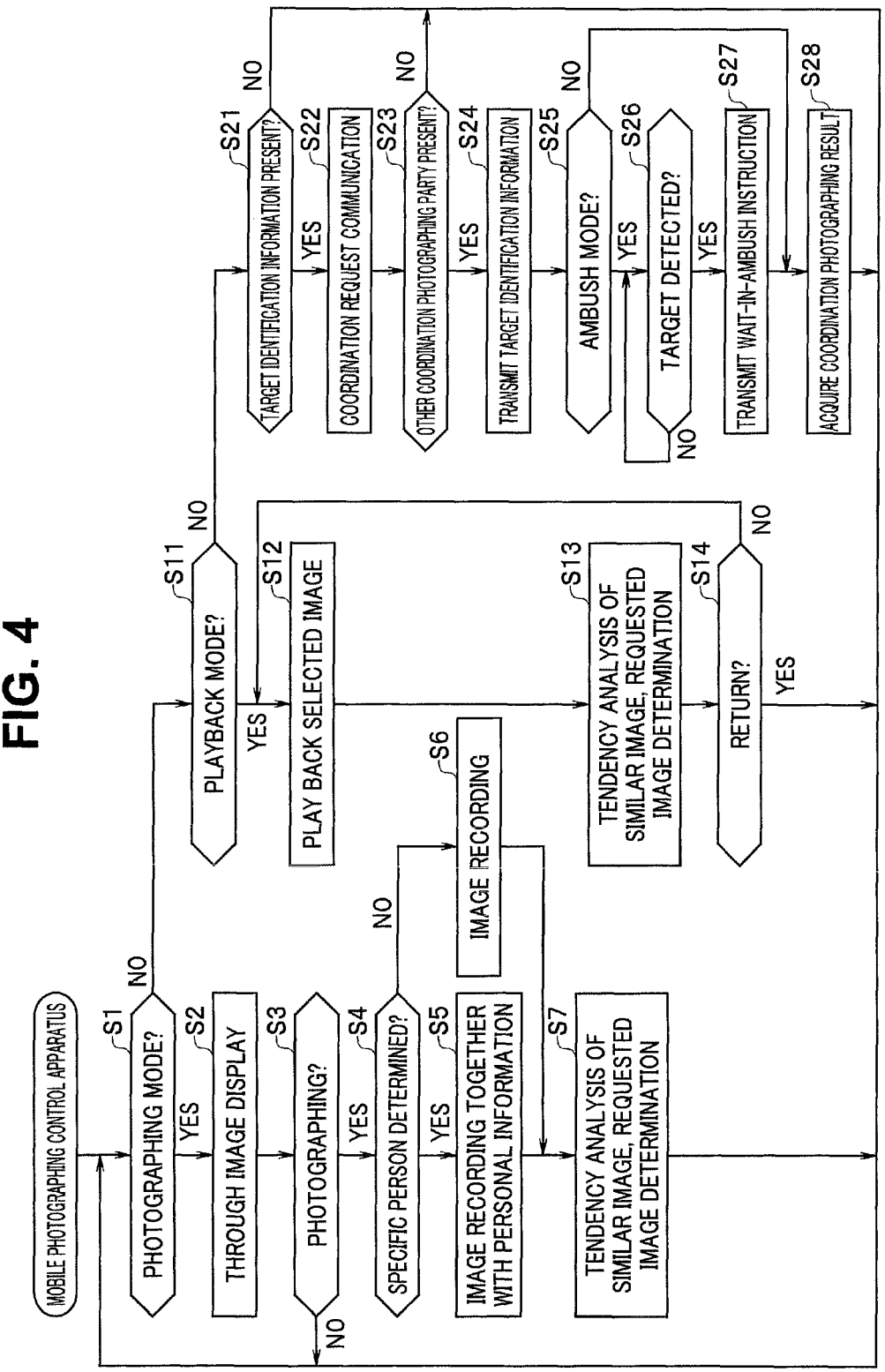
FIG. 4 is a flowchart illustrating operation of a mobile photographing control apparatus 20.
Figure 5:
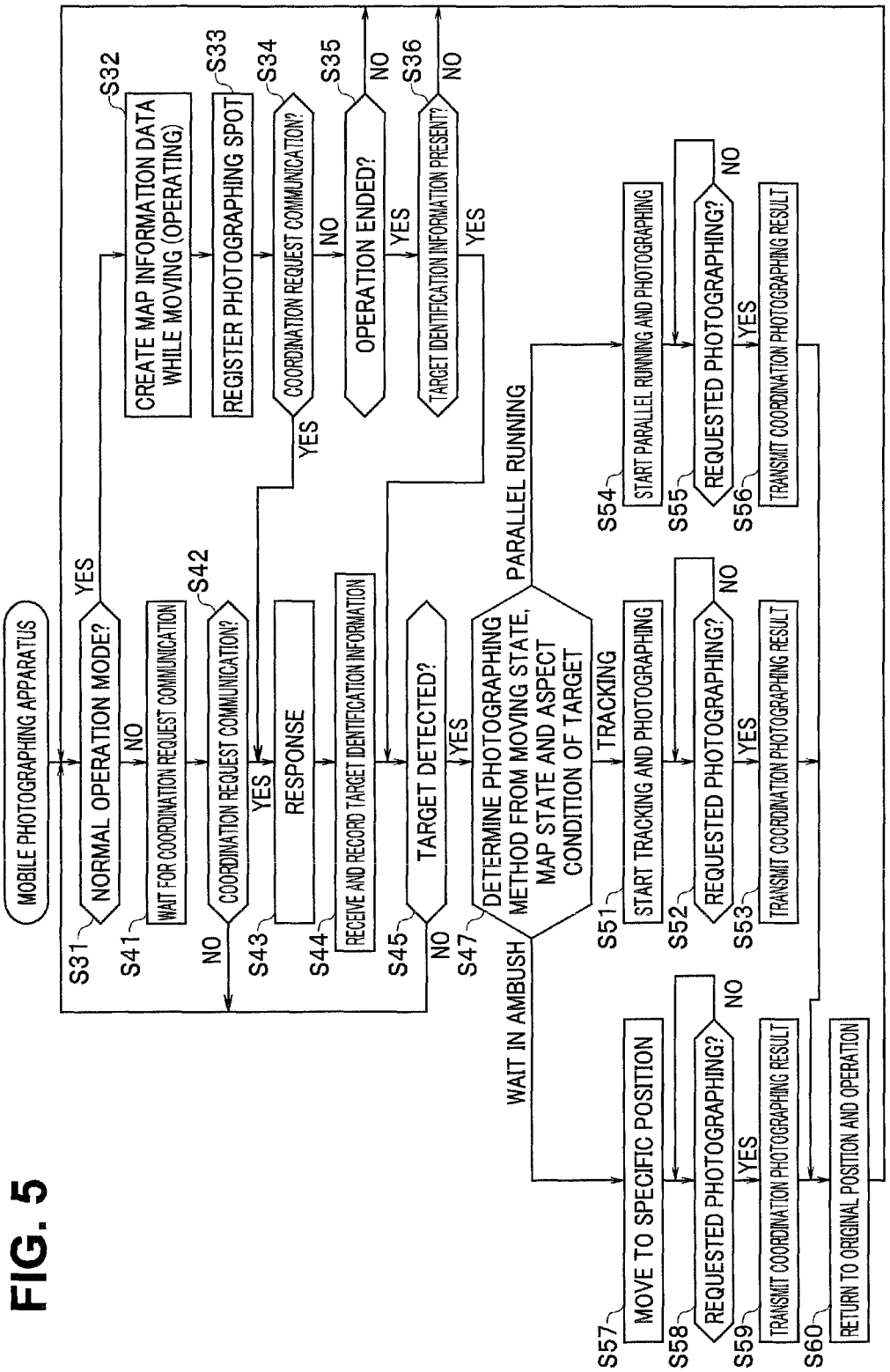
FIG. 5 is a flowchart illustrating operation of a mobile photographing apparatus 10.
Figure 6:
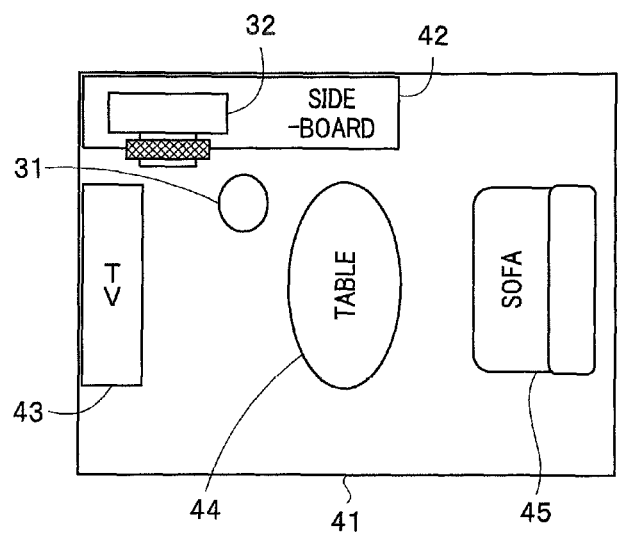
FIG. 6 is a diagram illustrating a situation in which the mobile photographing control apparatus 20 and the mobile photographing apparatus 10 operate in coordination to perform photographing.
Figure 7:
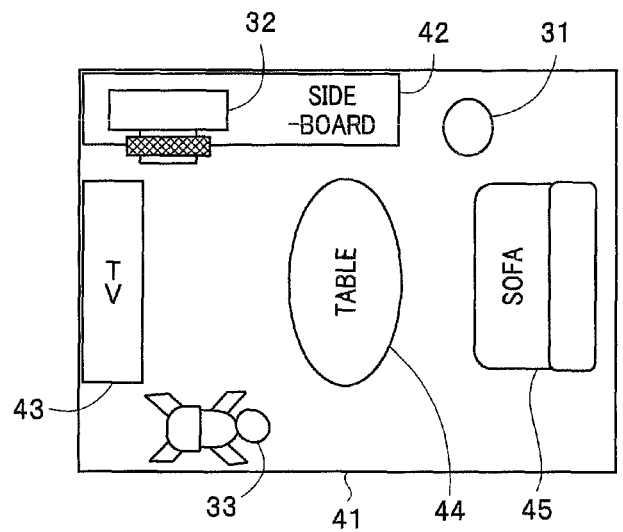
FIG. 7 is a diagram illustrating a situation in which the mobile photographing control apparatus 20 and the mobile photographing apparatus 10 operate in coordination to perform photographing.

Next, operation of the present embodiment configured as described above will be described with reference to FIG. 3 to FIG. 7. FIG. 3 is a diagram illustrating a situation of use according to the embodiment. FIG. 4 is a flowchart for describing operation of the mobile photographing control apparatus 20 and FIG. 5 is a flowchart for describing operation of the mobile photographing apparatus 10. FIG. 6 and FIG. 7 are diagrams illustrating a situation in which the mobile photographing control apparatus 20 and the mobile photographing apparatus 10 operate in coordination to pick up an image.

FIG. 3 shows an example where images of a baby 33 as an object are picked up using a photographing device 32 as the mobile photographing control apparatus 20 and a robot cleaner 31 as the mobile photographing apparatus 10. The photographing device 32 is provided with the respective circuits of the mobile photographing control apparatus 20 in FIG. 1. The photographing device 32 includes a lens barrel 32a and a lens 32b that constitute the image pickup section 23 in FIG. 1 and acquires various picked-up images of an object including the baby 33. The control section 21 provided in the photographing device 32 generates target identification information based on the acquired picked-up image.

The robot cleaner 31 is provided with the respective circuits of the mobile photographing apparatus 10 in FIG. 1. The robot cleaner 31 is provided with wheels 31a that constitute the moving section 12, and can move freely in a desired direction by rotating the wheels 31a. The robot cleaner 31 has a columnar housing and the image pickup section 13a including an image pickup range in a predetermined diameter direction from a side face of the housing is provided on the side face.

In step S1 in FIG. 4, the control section 21 of the mobile photographing control apparatus 20 using the photographing device 32 determines whether or not the photographing mode is specified. When the photographing mode is specified, the control section 21 displays a through image in step S2. That is, the control section 21 causes the image pickup section 23 to pick up an image of an object, gives the picked-up image to the display section 26 as a through image so as to be displayed. Next, the control section 21 determines the presence or absence of the user's photographing operation (step S3), and returns the process to step S1 when no photographing operation is performed.

When the user's photographing operation is performed, the control section 21 moves to step S4 and determines each object or the like in the picked-up image through image recognition. For example, the control section 21 determines a specific person or pet or the like in the picked-up image. When a recognizable determination result is obtained from the picked-up image, the control section 21 gives information on the determination result, for example, the picked-up image together with personal information to the recording section 27 so as to be recorded therein (step S5). Note that when the recognizable determination result is not obtained, the control section 21 gives only the picked-up image to the recording section 27 so as to be recorded therein (step S6). Note that when performing object recognition, the control section 21 may use a database set in advance, for example, a built-in database or a database obtained by a computer on the cloud.

In the next step S7, the control section 21 generates target identification information. For example, the control section 21 analyzes images recorded in the recording section 27, analyzes a tendency of similar images and determines an object, images of which are preferably picked up by the user as a requested image. The control section 21 generates target identification information to identify the object which is the target of the requested image and causes the target information memory 25 to store it.

For example, when an aspect condition for a specific target is set through the user's operation on the operation input section 24, the control section 21 causes the target information memory 25 to store the aspect condition as well. The target identification information shown, for example, in FIG. 2 is obtained in this way. Note that the respective records R1 to R3 in the target identification information in FIG. 2 are obtained through the user's photographing operation, but all or some of the pieces of information of the items i1 to i4 can be obtained through an image analysis of the control section 21. Note that all the pieces of information of the items i1 to i4 may be acquired based on the user's operation.

Upon determining in step S1 that the photographing mode is not set, the control section 21 moves to step S11 and determines whether or not a playback mode is specified. When the playback mode is specified, the control section 21 selects and plays back an image based on a selection operation of the user from among the images recorded in the recording section 27 in step S12, and causes the display section 26 to display the image on a display screen. The control section 21 is configured to generate target identification information also in this playback mode. For example, the control section 21 analyzes images being played back, performs a similar image tendency analysis and determines an object preferably played back by the user as a requested image. The control section 21 generates target identification information to identify the object (target) which is the target of this requested image and causes the target information memory 25 to store it.

When the control section 21 determines that the playback mode is not specified in step S11, the control section 21 moves the process to step S21 and determines whether or not the target identification information is stored in the target information memory 25. When the target identification information is not stored in the target information memory 25, the control section 21 returns the process to step S1. When the target identification information is stored, the control section 21 searches for a mobile body that has a communication function and can take some action on the target and attempts communication with the mobile body in step S22. For example, the control section 21 attempts communication (coordination request communication) with the mobile photographing apparatus 10 that can perform image pickup (hereinafter referred to as "coordination photographing") in accordance with the target identification information from the mobile photographing control apparatus 20. Note that the control section 21 may attempt coordination request communication every time target identification information is stored or may attempt coordination request communication at a predetermined time interval. Furthermore, the control section 21 may perform coordination request communication in response to access from the mobile photographing apparatus 10 which is the other communicating party. Furthermore, the control section 21 may also perform coordination request communication based on the user's operation.

The control section 21 determines in step S23 whether or not communication with the mobile photographing apparatus 10 is established. When coordination request communication with the mobile photographing apparatus 10 is established, the control section 21 moves the process to step S24 and transmits target identification information to the mobile photographing apparatus 10. Note that when coordination request communication with the other coordination photographing party cannot be established in step S23, the control section 21 returns the process to step S1.

The mobile body that receives the target identification information detects a target specified by the target identification information and thereby takes predetermined action. For example, the mobile photographing apparatus 10 picks up images within a predetermined image pickup range through the image pickup section 13a, and if the target exists within the image pickup range, the mobile photographing apparatus 10 picks up images under the aspect condition indicated by the target identification information. Furthermore, according to the present embodiment, even when the mobile photographing apparatus 10 is not picking up images of the target, the mobile photographing control apparatus 20 can instruct to wait in ambush for the target to pick up images.

In step S25, the control section 21 determines whether or not such an ambush mode is specified. When no ambush mode is specified, the process is moved to step S28, and upon receiving the picked-up image of the target as the coordination photographing result from the mobile photographing apparatus 10, the control section 21 causes the recording section 27 to record the picked-up image. On the other hand, when the ambush mode is specified, the control section 21 detects the target specified by the target identification information. For example, when the image pickup section 23 picks up images of the target, the control section 21 detects the target. Upon detecting the target, the control section 21 moves the process to step S27 and transmits a wait-in-ambush instruction. Upon receiving the wait-in-ambush instruction, the mobile photographing apparatus 10 moves to the wait-in-ambush position set in the target regardless of whether or not the target exists within the image pickup range of the image pickup section 13a and is brought into a target photographing waiting state. Note that when the target identification information includes a plurality of targets, the mobile photographing apparatus 10 may move to the wait-in-ambush position regarding the target assigned the highest priority.

Note that the example in FIG. 4 shows an example where the control section 21 transmits a wait-in-ambush instruction in the ambush mode, but contents of a wait-in-ambush instruction may be included in the target identification information in advance. In this case, upon receiving the target identification information including the wait-in-ambush instruction, the mobile photographing apparatus 10 may move to the wait-in-ambush position set in the target regardless of whether or not the target exists within the image pickup range of the image pickup section 13a and is brought into a target photographing waiting state.

In this case, photographing spots are recorded in the map information of the mobile photographing apparatus 10 and the mobile photographing apparatus 10 can preferably determine how it can move to the photographing spots without obstacles. For that purpose, the mobile photographing apparatus has information on the moving distance of a moving route and movable speed or the like and can preferably perform control in consideration of the time period to reach the position. Since the expression "wait-in-ambush" is used, it is necessary to move faster than the moving target and reach the place earlier, and so the movement can be abandoned in consideration of power saving before starting to move as required. Since such a situation exists, there can be a case where it is more reasonable to perform such photographing as to determine that a baby or a pet enters the room based on a voice, a footstep, a sound or the like using a microphone or a remote sensor capable of making a determination no matter whether the target is located at a distant place, in a shielded state or at a dead angle, and immediately start to wait in ambush for it. Such a determination is made by preparing a database of voice specific to the target or voice accompanying the movement and comparing the voice with a sound collection result.

In step S31 in FIG. 5, the mobile photographing apparatus 10 determines whether or not a normal operation mode is in effect. In the normal operation mode, the mobile photographing apparatus 10 performs operation accompanying a movement. For example, when the mobile photographing apparatus 10 is the robot cleaner 31, the mobile photographing apparatus 10 cleans the floor while moving around in the room or the like (step S32). In this case, the map information section 14 of the mobile photographing apparatus 10 creates a map of the room and causes the map information storage section 14a to store map information.

For example, in the case of the robot cleaner, room mapping is possible using a radar function based on the presence or absence of reflection or a time difference of an infrared or laser beam or image acquisition or an image determination function of a built-in camera. For example, assuming an initial position of the own apparatus (e.g., charging station position) as an origin, if the four directions of east, west, north, and south are determined using an azimuth sensor or the like and coordinates of the positions of places to which the robot cleaner moves and the presence or absence of obstacles is sampled, it is possible to acquire data as to which direction there is no obstacle when seen from the location of the robot, in which direction there are obstacles and what image features the obstacles have. This makes it possible to determine the positions of the obstacles and differentiate such directions from a route along which the robot can travel and perform mapping of the room. If the robot travels within the broadest possible range to grasp the scale of the room first, and then gradually determines the inside of the room, it is possible to realize mapping that allows an evaluation as to the dimension of the moving range of the room (or layout) or what articles are located where and so on. Of course, it is possible to make the robot learn a map of results of the user describing, for example, the shape and size of the room first or input locations of various obstacles from a keyboard. If a characteristic obstacle is stored in an image database every time, such a database becomes one including data including what articles are located at which positions (room coordinates), and by only specifying a background, it is possible to determine where to go to be able to photograph an image with the background. When the background can be photographed from a plurality of directions, image map information may be acquired as information with respect to the photographing positions from the plurality of directions. Thus, target identification information for identifying a moving photographing target is given to a self-traveling photographing apparatus having an image pickup section provided on a mobile body, and it is thereby possible to acquire information on a photographing position to which the mobile body should move to photograph a photographing target and further acquire information on a background against which the photographing target is photographed. In this way, the device can self-travel up to a position at which the target specified by the target identification information is photographed. Furthermore, this photographing apparatus can move to a position indicated by acquired information and wait for the target to appear. That is, the image pickup section of this apparatus can detect the background as well as the moving target. Of course, when there is no variation in the background, since the apparatus already has the information, the apparatus need not bother to go to the place to re-determine the background. In order for the image pickup section to pick up images of the moving target, movement control is performed to cause the mobile body to move along with the control by the image pickup section to pick up images of the target.

FIG. 6 illustrates a situation of a room 41. In the room 41, a side-board 42 and a television receiver (TV) 43 are arranged along a wall. Moreover, a table 44 is placed at the center of the room 41 and a sofa 45 is placed in front of the table 44. Note that the photographing device 32 is placed on the side-board 42, and the photographing device 32 can pick up images of part of the image pickup range of the room 41. Furthermore, the robot cleaner 31 which is the mobile photographing apparatus 10 exists on the floor surface of the image pickup range of the room 41.

As described above, an image pickup position where it is possible to pick up images of a position having a difference in height is suitable for image pickup of the baby standing holding onto something. When creating map information, the robot cleaner 31 registers the position information of such a photographing spot with the map information storage section 14*a* (step S33).

When it is determined in step S31 that the normal operation mode is not specified, the control section 11 of the robot cleaner 31 is brought into a waiting state for coordination request communication in step S41. Next, the control section 11 determines whether or not coordination request communication is generated (step S42). When no coordination request communication is generated, the control section 11 returns the process to step S31.

When it is determined in step S42 that coordination request communication is generated, the control section 11 responds to coordination request communication in step S43, receives target identification information from the mobile photographing control apparatus 20, causes the target information memory 15 to store the target identification information (step S44), and then moves the process to step S45.

Note that according to the present embodiment, the control section 11 of the robot cleaner 31 determines whether or not coordination request communication is generated from the mobile photographing control apparatus 20 even during operation (step S34). When it is determined in step S34 that coordination request communication is generated, the control section 11 suspends the operation, moves the process to step S43 and responds to the coordination request communication. When no coordination request communication is generated, the control section 11 moves the process from step S34 to step S35 and determines whether or not the operation is ended. When the operation is not ended, the control section 11 returns the process to step S31, whereas when the operation is ended, the control section 11 determines in step S36 whether or not the target identification information is stored in the target information memory 15. When the target identification information is not stored in the target information memory 15, the control section 11 returns the process to step S31, whereas when the target identification information is stored in the target information memory 15, the control section 11 moves the process to step S45.

Upon receiving the target identification information in step S44 or upon determining in step S36 at an end of the operation that the target identification information is stored, the control section 11 detects the target indicated by the target identification information (step S45).

In this step S45, the photographing movement control section 11*b* in the control section 11 detects the target by, for example, causing the image pickup section 13*a* to pick up images of the target. Note that when detecting the target, if the target specified by the target identification information does not exist within the image pickup range, the photographing movement control section 11*b* may perform control according to a predetermined rule, causing the mobile photographing apparatus 10 to move or change the image pickup direction so that the target exists within the image pickup range. When the target cannot be detected even when, for example, a predetermined time passes or when the target cannot be detected even after picking up images while moving along a predetermined route, the control section 11 returns the process to step S31.

Upon detecting the target, the control section 11 determines a photographing method according to the moving state of the target, a map state, an aspect condition or an ambush instruction (step S47). Although simplified steps are executed here, there can also be cases where even when ambush photographing is preferable, it is abandoned by judging various situations. That is, there can be a case where the photographing target moves fast or a case where the route cannot be searched due to the presence of an obstacle, or the like. A case where the only route along which the apparatus moves coincides with the route along which the target moves should also be equally considered as a case with the presence of an obstacle, otherwise collision would occur, which is not desirable. That is, one of the important points of the present application can be said that, for example, if the mobile photographing apparatus is a robot cleaner, when a place where images of the specified target seem to be easily picked up or a place desired by the user is specified, such places can be located by determining photographing spots by making full use of the position information provided for the robot cleaner. For this purpose, it is necessary to judge or determine a route from a positional relationship between the position of the own apparatus and the photographing spot, and thereby determine the distance. This also requires a contrivance of searching for routes other than routes that would be selected by a moving target (a plurality of routes may be searched and the route along which the target moves may be erased from the routes), and includes a procedure of calculating a required time period from the speed of the own apparatus, determining the speed of the target from an image variation observed through a plurality of times of photographing and determining the route.

The place where images of the specified target seem to be easily picked up varies depending on the moving target. Based on this idea, it is possible to search for similar images of the moving target using the moving target itself and search for places where images similar to the background image exist on a map where the moving photographing device is currently located (in the case of the robot cleaner, this can be known from a place in the room or a building or from a layout of articles that exist there) based on the searched images and features of the background image parts.

Thus, this step is adapted to be able to estimate a time at which the target arrives at the position, compare it with the time required for the own apparatus to arrive there and determine as far as whether or not wait in ambush is possible. There can also be a flow of abandoning the wait in ambush from the standpoint of danger avoidance or power saving, but such a flow is omitted here.

FIG. 5 illustrates parallel running, tracking and wait in ambush as examples of the photographing method. In an application in which the user himself/herself does not move but entrusts the photographing to the mobile body, inclusion of a mode in which branching takes place here is preferable since the features of being the mobile body can thus be effectively exhibited.

For example, when the control section 11 detects that the target is moving across the image pickup range of the image pickup section 13a, through an analysis of picked-up images obtained by the image pickup section 13a, the control section 11 moves the process to step S54, controls the moving section 12 and the tracking control section 17 so as to maintain the target within the image pickup range, runs parallel to the target and starts picking up images of the target. After performing the image pickup (requested photographing) specified by the target identification information, the control section 11 transmits the picked-up image as the coordination photographing result to the mobile photographing control apparatus 20 via the communication section 16. The control section 21 of the mobile photographing control apparatus 20 gives the picked-up image transmitted in step S28 in FIG. 4 to the recording section 27 to record it.

Now suppose, for example, that an ambush mode is specified in the mobile photographing control apparatus 20. Also suppose that the wait-in-ambush target is the baby (user family 2) shown in the target identification information in FIG. 2 and the baby 33 in FIG. 3. In this case, standing holding onto something is specified as the aspect condition. The control section 21 of the mobile photographing control apparatus 20 detects the baby 33 in step S26 in FIG. 4. As shown in FIG. 7, suppose the baby 33 enters the image pickup range of the photographing device 32 in the room 41. Then, the control section 21 determines that the baby 33, the target, is detected through an image analysis of the picked-up image from the image pickup section 23. Thus, the control section 21 transmits a wait-in-ambush instruction to the mobile photographing apparatus 10. Here, the speed is determined from images repeatedly picked up or the route is predicted from the moving direction as well.

Upon receiving the wait-in-ambush instruction, the control section 11 of the mobile photographing apparatus 10 moves the process from step S47 to step S57, and moves to a specific position suitable for image pickup of standing holding onto something specified in the target identification information, that is, the position including a difference in height registered in step S33. In FIG. 7, this specific position is a position where the image pickup section 13a can pick up an image of the difference in height of the sofa 45. After performing the image pickup (requested photographing) of standing holding onto something specified by the target identification information (step S58), the control section 11 transmits the picked-up image as the coordination photographing result to the mobile photographing control apparatus 20 via the communication section 16 (step S59). The control section 21 of the mobile photographing control apparatus 20 gives the picked-up image transmitted in step S28 in FIG. 4 to the recording section 27 to record it. Next, in step S60, the control section 11 returns the mobile photographing apparatus 10 to its original position and returns the process to step S31.

Note that although not described in FIG. 5, if it is not possible to pick up images of the baby 33 standing holding onto something even when a predetermined time passes after a movement to a specific position, the process may be moved from step S58 to step S60 or images of the baby 33 in a pose other than the pose of standing holding onto something may be picked up and the image pickup result may be transmitted to the mobile photographing control apparatus 20.

In the present application, features using the mapping function of the mobile apparatus and background information of each position are described, and so wait-in-ambush photographing is especially mentioned, but the wait-in-ambush photographing is not always possible, and so when the wait-in-ambush photographing is not possible, tracking photographing is performed. Whether or not wait-in-ambush photographing is possible depends on the traveling direction or traveling speed of the moving target, but these can be calculated by analyzing the result of photographing the movement of the moving target from the images obtained by the mobile apparatus over a plurality of times and determining in which direction and how the movement of the moving target changes. The photographing position of wait-in-ambush photographing can also be determined by determining at which position the photographing position is located with respect to the current position of the mobile apparatus and what is the distance from the current position of the mobile apparatus. This makes it possible to determine the positional relationship between the mobile apparatus and the moving target on the map. Once the map information is obtained, as a car navigation system, it is possible to make a route search in a specific background section and determine a time of arrival at the specific background section. This makes it possible to know whether wait in ambush is possible or not, and determine whether or not tracking photographing is desirable including the parallel running speed and the presence or absence of a space necessary for a movement. There may also be a case where neither wait-in-ambush photographing nor tracking photographing is possible due to the presence of a difference in height or an obstacle, but in such a case, the target may be photographed from behind by catching a scene of the target leaving away.

Furthermore, if neither parallel running nor wait in ambush is selected as the photographing method in step S47, the control section 11 selects tracking and executes a process in step S51. That is, when the target is detected within the image pickup range of the image pickup section 13a, the photographing movement control section 11b tracks the target and starts image pickup (step S51). After performing the image pickup (requested photographing) specified by the target identification information (step S52), the control section 11 transmits the picked-up image which is the coordination photographing result to the mobile photographing control apparatus 20 via the communication section 16 (step S53). The control section 21 of the mobile photographing control apparatus 20 gives the picked-up image transmitted in step S28 in FIG. 4 to the recording section 27 to record it.

Thus, according to the present embodiment, the mobile photographing control apparatus generates target identification information for setting an object, image pickup of which is desired by the user, a pose and a composition or the like based on the picked-up image acquired through the user's photographing operation. When a mobile photographing apparatus capable of coordination photographing through coordination request communication exists, the mobile photographing control apparatus transmits target identification information to this mobile photographing apparatus. The mobile photographing apparatus can pick up images while moving, and can pick up images of an object desired by the user, at a position desired by the user, with a desired pose or a desired composition or the like. This allows the user to perform image pickup desired by the user even when the user himself/herself is not present at the photographing place or at a place where it is difficult for the user to pick up images.

Note that an example has been described in the above embodiment where the mobile photographing control apparatus generates target identification information for identifying the photographing position of the mobile photographing apparatus, the target, pose, composition or the like. However, the target identification information may be generated based on a picked-up image through the user's operation, and the target identification information may be generated by any circuit. For example, any one of the control section of the mobile photographing control apparatus and the control section of the mobile photographing apparatus may generate the target identification information, or both control sections may operate in coordination to generate the target identification information. Furthermore, the target identification information may be generated not only by one or both of the control sections but also using a computer on the cloud.

For example, when the mobile photographing apparatus generates the target identification information, the mobile photographing control apparatus may transmit a picked-up image acquired through the user's operation to the mobile photographing apparatus. In this case, the mobile photographing apparatus may recognize the target through an image analysis on the received picked-up image and generate the target identification information in accordance with the frequency with which recognition results appear, or the like. Furthermore, when only the aforementioned standing holding onto something of the baby is set as the aspect condition in the target identification information generated by the mobile photographing control apparatus, a specific position suitable for the image pickup of the baby standing holding onto something may be determined by the photographing movement control section of the mobile photographing apparatus.

In this case, a situation is assumed in which the place where the baby is likely to stand holding onto something may be inputted in advance or predicted, and what should be considered further is whether or not the photographing apparatus can go to the place first and wait for the target to arrive there. Therefore, while it is necessary to estimate the speed and the route of the baby, the route can be determined from the map and the current position, and the speed can be determined from the amount of movement of the baby in each photographing frame or the average moving speed of the baby. This makes it possible to know a time at which the baby arrives at the place of standing holding onto something. The present application can be expressed as a mobile photographing apparatus or a moving type photographing device constructed of an image sensor configured to be movable and enabled to perform image pickup to pick up images of a specified photographing target, a memory configured to store map information within a moving range of the image sensor, and a prediction section configured to detect a movement of the photographing target using a picked-up image of the image sensor and predict a time at which the photographing target moves to a specific place according to the detection result of the movement of the photographing target and the map information. Furthermore, the apparatus preferably moves along a route different from the route, and if such a route is assumed to be determinable with obstacle information included in the map information and the moving speed of the apparatus is also known from design values or the like, the mobile photographing apparatus can be said to include a target route prediction section configured to predict a moving route of the target, an image sensor route determining section configured to determine a moving route of the image sensor in a place where the target can be photographed in the specific place and an arrival time determining section configured to determine a time at which the image sensor arrives from the moving route determination result and the moving speed of the image sensor.

Furthermore, the above embodiment has described an example of an apparatus having an image pickup function as the mobile photographing control apparatus. However, the present embodiment is characterized by determining a target or scene or the like desired by a user and controlling a movement and image pickup of the mobile photographing apparatus based on a picked-up image acquired through the user's operation, that is, a picked-up image reflecting the user's preferences. Therefore, if it is possible to read the picked-up image acquired through the user's operation from a recording medium, even an apparatus which has no image pickup function can function as a mobile photographing control apparatus. For example, a personal computer can be adopted as the mobile photographing control apparatus. Not only a photographing device such as a digital camera but also a smartphone or tablet PC can be adopted as the mobile photographing control apparatus. Smartphones often have a communication function such as WiFi as well as a photographing function, and can generate target identification information based on the picked-up image acquired through the user's operation and transmit the generated target identification information to the mobile photographing apparatus.

The target identification information can be obtained not only when an image of an object is acquired through image pickup but also when the image is played back. That is, the target identification information may be generated based not only on images preferably picked up by the user but also images preferably played back by the user. Therefore, not only an apparatus having an image pickup function but also an apparatus having a playback function may be adopted as the mobile photographing control apparatus. For example, the mobile photographing control apparatus may be configured to access a web site using a computer, determine a user-desired image through a tendency analysis of images acquired and acquire target identification information.

Note that the above embodiment has described a robot cleaner as an example of the mobile photographing apparatus. The robot cleaner acquires map information of a room to clean the room. Therefore, when an instruction is given to the robot cleaner, photographing using the room map is possible.

Note that although an example is shown in FIG. 1 where the mobile photographing apparatus and the mobile photographing control apparatus are configured as separate bodies, both apparatuses may be configured as an integrated unit. For example, as a mobile body, there is an apparatus capable of picking up images through the user's remote operation such as a robot cleaner that can instruct photographing through a smartphone. In this case, the mobile body may be configured to record images acquired through the photographing operation in the recording section in the mobile body as favorite object information, generate target identification information based on the recorded picked-up image and control a movement and image pickup based on the target identification information.

Although the above embodiments have described an example of performing image pickup as action on a target specified by target identification information, not only image pickup but also various kinds of action may be executed. For example, the apparatus may be configured to set a specific person as a target, give the target identification information generated based on a photo of this person to a mobile body such as a drone, cause the mobile body to search for and track the specific person and control the mobile body so as to transmit the position information. Furthermore, the apparatus may be configured to give the target identification information generated based on photos of specific trees to a drone, cause the drone to fly through a space as appropriate and execute, upon detecting the trees, an action such as spraying agrochemicals over the trees.

The above embodiments have described a digital camera as an example of the device for image pickup, but a digital single lens reflex camera, a compact digital camera or a camera for moving images such as a video camera, movie camera may be used, and further it goes without saying that a camera built in a portable information terminal (PDA: personal digital assist) such as a mobile phone or smartphone may be used. The mobile body is applicable not only to a robot cleaner but also to all types of movable devices.

Though the term "mobile" cannot be simply associated with a machine such as a scanner where the machine itself does not move but only an image pickup section moves, such a machine is also within an envisaged range of "mobile" machines. For example, in an application of observing microorganisms, a microscope or a stage may be moved, and the present application is applicable to such scientific observations as well as image pickup devices that pick up images of not only a partial range but also a wider range or a whole range such as a capsule endoscope or a CT scanner, and the technique of the present application is effectively applicable to a case of determining whether or not tracking is possible from scanning movements and differences in the target.

The present invention is not limited to the above embodiments as they are, but can be embodied by modifying the components without departing from the spirit and scope of the present invention in an implementation stage. Various inventions can be formed through appropriate combinations of the plurality of components disclosed in the above embodiments. For example, some of all the components disclosed in the above embodiments may be deleted. Moreover, the components among different embodiments may be combined as appropriate.

Regarding the scope of claims, specification and operation flows in the drawings, although the terms "first," "next" or the like are used in description for convenience, this, however, does not mean that it is mandatory that steps should be executed in this order. Moreover, it goes without saying that steps constituting these operation flows except those influencing the nature of the invention can be omitted as appropriate.

Note that among the techniques described here, the control technique described mainly in flowcharts can often be set by a program and there are cases where the control technique is stored in a recording medium or a recording section. As the method of recording the control technique in the recording medium or the recording section, the control technique may be recorded at the time of product shipment or using a distributed recording medium or it may be downloaded through the Internet.

Note that the elements recited as a section and a unit in the embodiments may be configured by combining a dedicated circuit and a plurality of general-purpose circuits, and as needed, by combining a microcomputer and a processor such as a CPU or a sequencer, each of which operates in accordance with software programmed in advance. In addition, a configuration is possible in which a part or all of the control can be executed by an external device. In such a configuration, wire and wireless circuits are interposed. Communication has only to be performed on Bluetooth (registered trademark), WiFi, or a telephone network. Communication may be performed using USB or the like. The dedicated circuit, general-purpose circuits, and a control section may be unified as an ASIC. The moving section is constituted of various actuators, and as needed, a connection mechanism for mobility, and the actuators are operated by a driver circuit. The driver circuit is also controlled by a microcomputer or an ASIC in accordance with a specific program. Detailed correction and adjustment of such control may be performed based on information outputted by various sensors or peripheral circuits.

What is claimed is:

1. A mobile photographing apparatus comprising:
   an image sensor provided in a mobile body;
   a memory configured to store map information within a moving range of the mobile body; and
   a control circuit configured to:
   receive, from an external device, target identification information and condition information, wherein the target identification information includes an image of a moving photographing target captured by the external device, and wherein the condition information specifies a predetermined condition of the moving photographic target, wherein an additional image of the moving photographing target is captured using the condition information when the moving photographing target is within the predetermined condition,
   determine a photographing position for capturing the additional image based on the target identification information,
   perform movement control to cause the mobile body to move to capture the additional image of the moving photographing target through the image sensor based on the photographing position and the map information, and cause the image sensor to capture the additional image of the moving photographing target based on the target identification information.

2. The mobile photographing apparatus according to claim 1, wherein the control circuit causes the mobile body to move to the photographing position based on position information for the photographing position and the map information.

3. The mobile photographing apparatus according to claim 2, wherein the control circuit causes the mobile body to move to the photographing position based on a comparison between a picked-up image of the image sensor and a background of the image of the moving photographing target captured by the external device.

4. The mobile photographing apparatus according to claim 1, wherein when the mobile body cannot be moved to the photographing position, the control circuit identifies the moving photographing target through an image analysis of the additional image, causes the mobile body to run parallel to the moving photographing target, and causes:

the image sensor to photograph the moving photographing target, the mobile body to track the moving photographing target to cause the image sensor to photograph the moving photographing target, or the image sensor to photograph the moving photographing target without causing the mobile body to move.

5. The mobile photographing apparatus according to claim 1, wherein the control circuit causes, when the moving photographing target enters an image pickup range of the image sensor, the image sensor to pick up the additional image of the moving photographing target.

6. The mobile photographing apparatus according to claim 1, wherein the mobile body comprises a robot cleaner, and the control circuit detects the photographing position during a cleaning operation based on the position information acquired based on the target identification information.

7. The mobile photographing apparatus according to claim 1, wherein upon receiving position information indicating that the moving photographing target is located near the photographing position acquired based on the target identification information, the control circuit causes the mobile body to move to the photographing position.

8. The mobile photographing apparatus according to claim 1, wherein the control circuit causes the mobile body to move to track the moving photographing target and causes the image sensor to pick up the additional image of the moving photographing target in a pose acquired based on the target identification information.

9. The mobile photographing apparatus according to claim 1, wherein the condition information is at least one selected from the group consisting of pose information of the moving photographing target, position information of the moving photographing target, background information of the moving photographing target, and activity information of the moving photographing target.

10. The mobile photographing apparatus according to claim 1, wherein the position information is acquired by applying at least one selected from the group consisting of facial recognition information, character recognition information, and meta information to the image of the moving photographing target captured by the external device.

11. The mobile photographing apparatus according to claim 1, wherein the moving photographing target is a toddler.

12. A mobile photographing apparatus comprising:

a memory configured to store map information;

a communication circuit configured to receive target identification information and condition information from an external device, wherein the target identification information includes an image of a predetermined target acquired by the external device, and wherein the condition information specifies a predetermined condition of the moving photographing target, wherein an additional image of the predetermined target is captured using the condition information when the predetermined target is within the predetermined condition;

an image sensor provided in a mobile body and configured to photograph the predetermined target; and a map information circuit configured to create information for identifying a photographing location for the predetermined target to be photographed in accordance with the map information and the target identification information.

13. The mobile photographing apparatus according to claim 12, further comprising a control circuit configured to perform movement control to cause the mobile body to move to pick up the image of a photographing target at the photographing location using the image sensor, and cause the image sensor to pick up the image of the photographing target.

14. A mobile photographing control apparatus comprising:

an image pickup circuit configured to acquire an image of a moving photographing target;

a target identification information generation circuit configured to receive identification information for identifying the moving photographing target and generate target identification information and condition information, wherein the target identification information includes the image of the moving photographing target and, wherein the condition information specifies a predetermined condition of the moving photographing target, wherein an additional image of the moving photographing target is captured using the condition information when the moving photographing target is within the predetermined condition;

a communication circuit configured to perform communication with a mobile body control circuit of a mobile body mounted with a mobile body drive circuit and an image sensor, the mobile body control circuit configured to control the mobile body drive circuit and the image sensor; and a control circuit configured to cause, when the communication by the communication circuit is established, the mobile body control circuit to transmit the identification information for controlling the mobile body drive circuit and the image sensor to capture the additional image of the photographing target based on the target identification information.

15. The mobile photographing control apparatus according to claim 14, wherein the target identification information generation circuit generates the target identification information based on a recognition result of the photographing target in the additional image and a frequency with which the photographing target appears in the additional image.

16. A photographing system comprising:
- an image sensor configured to acquire an image of photographing target in accordance with a photographing operation;
- a target identification information generation circuit configured to communicate with the image sensor and generate target identification information and condition information, wherein the target identification information includes the image of the photographing target, and wherein the condition information specifies a predetermined condition of the moving photographing target, wherein an additional image of the photographing target is captured using the condition information when the photographing target is within the predetermined condition;
- a mobile body control circuit configured to transmit the target identification information to a mobile body; and
- a communication circuit configured to perform communication with the mobile body comprising a mobile body drive circuit and a mobile body image sensor, the mobile body control circuit configured to control the mobile body drive circuit and the mobile body image sensor;
- wherein when the communication by the communication circuit is established, the mobile body control circuit transmits the target identification information to the mobile body for controlling the mobile body drive circuit and the mobile body image sensor to capture the additional image of the photographing target based on the target identification information.

17. A control method of a mobile photographing apparatus, the method comprising:
- acquiring, by an image sensor of a photographing device, a picked-up image of a target in accordance with a photographing operation;
- generating, by the photographing device, target identification information and condition information, wherein the target identification information is based on the picked-up image of the target acquired by the image sensor, wherein the target identification information includes the picked-up image, and wherein the condition information specifies a predetermined condition of the moving photographing target, wherein an additional image of the target is captured using the condition information when the target is within the predetermined condition;
- communicating, by the photographing device, the target identification information to the mobile photographing apparatus including a drive circuit; and
- photographing, by the mobile photographing apparatus, the target in accordance with the target identification information.

18. A photographing method for a mobile photographing control apparatus comprising:
- receiving map information within a moving range of a mobile body and target identification information and condition information, wherein the target identification information includes an image of a moving photographing target, and wherein the condition information specifies a predetermined condition of the moving photographing target, wherein an additional image of the moving photographing target is captured using the condition information when the moving photographing target is within the predetermined condition;
- performing movement control to cause the mobile body to move to capture the additional image of the photographing target using an image sensor based on the map information; and
- causing an image sensor provided in the mobile body to pick up the additional image of the photographing target based on the target identification information.

19. A non-transitory computer-readable recording medium configured to record a photographing program for causing a computer to execute:
- a step of storing map information within a moving range of a mobile body;
- a step of receiving target identification information and condition information, wherein the identification information includes an image of a moving photographing target, and wherein the condition information specifies a predetermined condition of the moving photographing target, wherein an additional image of the moving photographing target is captured using the condition information when the moving photographing target is within the predetermined condition generated in accordance with a user's operation;
- a step of performing movement control to cause the mobile body to move to capture the additional image of the photographing target using an image sensor based on the map information; and
- a step of causing an image sensor provided in the mobile body to capture the additional image of the photographing target based on the target identification information.

20. A mobile photographing apparatus comprising:
- a control circuit configured to receive, from an external device, target identification information and condition information, wherein the target identification information includes an image of a moving photographing target acquired by the external device, and wherein the condition information specifies a predetermined condition of the moving photographing target, wherein an additional image of the moving photographing target is captured using the condition information when the moving photographing target is within the predetermined condition;
- an image sensor configured to be movable and enabled to perform image pickup to capture the additional image of the moving photographing target;
- a memory configured to store map information within a moving range of the image sensor;
- a processor with a prediction circuit configured to detect a movement of the moving photographing target through a picked-up image of the image sensor and predict a time at which the moving photographing target moves to a specific place according to a result of detection of movement of the moving photographing target and the map information; and
- cause the image sensor to capture the additional image of the moving photographing target based on the target identification information.

21. The mobile photographing apparatus according to claim 20, wherein the processor further comprises:
- a target route prediction circuit configured to predict a moving route of the moving photographing target;
- an image sensor route determining circuit configured to determine the moving route of the image sensor at a standby position where the moving photographing target can be photographed in the specific place; and
- an arrival time determining circuit configured to determine an arrival time at which the image sensor arrives at the standby position based on the result of determining the moving route of the image sensor and a moving speed of the image sensor.

* * * * *

UNITED STATES PATENT AND TRADEMARK OFFICE
CERTIFICATE OF CORRECTION

PATENT NO. : 10,638,028 B2
APPLICATION NO. : 15/805341
DATED : April 28, 2020
INVENTOR(S) : Sato et al.

It is certified that error appears in the above-identified patent and that said Letters Patent is hereby corrected as shown below:

In the Claims

In Claim 18, Column 25, Line 56, after "mobile body" and before "target identification", delete "and" and replace it with ",".

Signed and Sealed this
Eighth Day of December, 2020

Andrei Iancu
*Director of the United States Patent and Trademark Office*